UNITED STATES PATENT OFFICE 2,078,836

SILICATES OF ALKALI METALS AND METHOD OF PRODUCING THEM

John D. Carter, Lansdowne, Pa., assignor to Philadelphia Quartz Company, Philadelphia, Pa., a corporation of Pennsylvania No Drawing. Application May 19, 1934,
Serial No. 726,573

9 Claims. (Cl. 23—110)

This invention relates to the art of making useful aqueous solutions of silicates of alkali metals, and more specifically to methods of controlling the properties of these solutions.

For many years aqueous solutions of the silicates made from metals of the alkali group and especially silicates of soda, and to a less extent the silicates of potash, have been used widely in industry. In many of the varied applications in which these silicates are useful, much depends upon the peculiar properties of the solutions. Among these may be mentioned their ability to form thin and even coats on surfaces of wood, paper or other materials, their ability to penetrate these surfaces to just the proper extent, to set with the loss of comparatively little water, and when dried, to form a bond of ample strength.

In such applications, the extent of penetration, the time during which the coating remains tacky enough to take hold upon another ply of material, the time required for the formation of a strong bond, and the tackiness of the coat, are important considerations. The extent of penetration depends largely on the viscosity of the solution. In some applications the toughness and elasticity of the coat, after drying may be important.

To meet the varied requirements of industry, manufacturers of silicates of the alkali metals, have adapted their products thereto by two general methods—(1) by proper concentration of the solutions and (2) by adjustment of the relative amounts of alkali-metal oxide and silica used in the manufacture of the silicate. Without implication as to the forms in which these substances exist in solutions, their relationship may be called conveniently, the alkali-silica ratio.

In commercial silicates this ratio varies over a wide range. When the ratio is 1 to 1, the substance in solution is a chemical individual which may crystallize out in nearly pure form. When still more alkali is present, other definite compounds may be formed. As the relative amount of silica increases from the 1 to 1 ratio, the solutions have more and more the nature of colloidal dispersions. Commercial silicates have been made in which the ratio of alkali to silica was about 1 to 4. Still larger relative amounts of silica are possible. In this specification the liquids spoken of as solutions of alkali-metal silicates of low alkali content (or equivalent expression) are the more or less colloidal dispersions in which the molecular ratio is one of alkali to three or more of silica.

The exact nature of the materials present in these colloidal dispersions is not known. The amount and condition of the dispersed substance have a marked influence on the properties of the fluid. Heretofore, the method available for increasing dispersion or peptization has been the introduction of caustic alkali, with or without additional water. One of the objects attained by my invention is the promotion of peptization by the use, either alone or in combination with alkaline materials, of non-alkaline substances.

It has been my experience that the peptizing effect of the non-alkaline materials is most pronounced in solutions in which the ratio approaches 1 part of alkali to 4 parts of silica. It is, however, not limited to any specific composition.

It is well known that silicates containing more alkali than is indicated by the ratio of 1 part alkali to 3 parts of silica, may be toughened by the addition of dextrin or molasses. These substances have not been found to exert the peptizing influence referred to above. It is therefore evident that the toughening and peptizing effects are not of the same character.

In general, the silicates containing the relatively smaller proportions of silica may be more concentrated than others, while retaining a texture which renders them suitable for many applications. Some desirable properties are found only in silicates containing a relatively small proportion of silica, and a larger proportion of alkali metal oxide.

In some applications these more alkaline silicates, although otherwise well adapted to the purpose in hand, are liable to stain sensitive materials, whereas less alkaline silicates would not do so. To secure the desirable properties of the more alkaline silicates, while keeping the alkali content very low, is one of the objects of this invention. From what has been said above, the usefulness of this will be apparent to those skilled in the art.

Among the characteristics of solutions of alkali-metal silicates containing relatively small amounts of alkali may be mentioned their lack of tackiness, their short setting times, and their high viscosities at relatively low concentrations. As already indicated, these properties may be altered by adding caustic alkali. This gives solutions which are comparable to those which would have been obtained if more alkali had been used in making the silicates originally. For some applications, such solutions are open to the objections already cited for the more alkaline silicates.

In the course of a study of this problem, I have found that the properties of the less alkaline silicate solutions made from metals of the alkali group may be greatly altered in desirable directions, by the addition of various substances which contain no alkali, and little or no water.

As examples in carrying out the present invention, may be given the following:—

*Example I.*—I may start with 100 parts by weight of a low-alkali aqueous silicate solution having a ratio of 1 part alkali to 3.83 parts of silica, of such a concentration that it will barely flow at room temperature. On account of its brittle texture and high viscosity such a solution would be quite unfit for use as an adhesive. By mixing into such a solution 8 parts by weight of dry sucrose, familiar as beet or cane sugar, at room temperature, the texture of the solution is greatly improved, and the viscosity thereof so reduced that a free-flowing liquid results. Such a liquid is well adapted for use as an adhesive. At the same time, the percentage of alkali in the liquid has been reduced.

*Example II.*—Starting with 155 gm. of an aqueous solution of potassium silicate of about $1K_2O$ to $3.8\ SiO_2$, and of a viscosity expressed by about 1440 centipoises, 3 gm. of cane sugar are added, reducing the viscosity to about 272 centipoises. The addition of 3 gm. of mannite to the same specimen will still further reduce the viscosity to about 106 centipoises.

*Example III.*—Starting with 150 gm. of an aqueous solution of sodium silicate, of about 1 $Na_2O$ to $3.8\ SiO_2$, having a viscosity of about 260 centipoises, several peptizing agents may be added in succession to the same specimen, with the following results:

| Peptizer | Amount | Resulting viscosity |
| --- | --- | --- |
|  | Gm. | Centipoises |
| Maltose | 1.5 | About 235 |
| Xylose | 1.5 | About 213 |
| Dextrose | 1.5 | About 166 |
| Galactose | 1.5 | About 161 |
| Cane sugar | 1.5 | About 156 |
| Mannite | 1.5 | About 119 |

An aqueous silicate solution having a ratio of 1 $Na_2O$ to $4.5\ SiO_2$ would be unsuited for use as an adhesive, on account of its short texture, high viscosity and its susceptibility to changes in temperature. Moreover, the loss of a relatively small amount of water would cause such a silicate, of a concentration suitable for adhesive uses, to stiffen or agglomerate into a jelly-like mass, which would be unsuited for these uses. The present invention however enables the properties of such a silicate solution to be brought under control, while the feature of low alkalinity is retained, by mixing with 100 parts by weight of such a solution, say, 10 parts by weight of sucrose or ordinary sugar. Accompanying the change in viscosity, the tackiness of the fluid, the time during which a layer of it is able to take hold on other bodies, the setting time, and the toughness of the coat formed on drying, are all increased. The susceptibility of such a silicate solution to change in temperature, and to the loss of water, are decreased when modified according to the present invention.

I have found that although sucrose exerts a peptizing influence upon the silicate when the alkali ratio is reduced below 1 $Na_2O$ to $4.5\ SiO_2$, its action is materially reduced when the alkali ratio is increased beyond 1 $Na_2O$ to $3.55\ SiO_2$.

As these examples show, any of the above-mentioned peptizing agents may be used either alone or they may be used in combination to reinforce each other.

Similar changes are produced when a less concentrated silicate solution is used as a starting point. Small amounts of the peptizing agents herein referred to may exert a notable effect. For instance, a low-alkali silicate solution of about 1 to 3.85 ratio and 34.3° Baumé had a viscosity represented by about 272 centipoises. After adding 1% of sugar (sucrose) the Baumé reading was 34.4°, and the viscosity was about 216 centipoises.

In contrast with the foregoing, the action of a commercial grade of molasses may be cited. Silicate of about 1 to 3.8 ratio, had a viscosity of 253 centipoises. Same silicate $+2\%$ of "black strap" molasses, had a viscosity of 434 centipoises.

It is generally recognized, when the viscosity of a colloidal dispersion is markedly decreased without the addition of liquid, that the peptization has been increased.

For the purposes of this specification, sucrose may be classed as a solid, non-alkaline, water-soluble non-electrolyte. On the other hand, the sucrose, if desired, may be employed in the form of commercial edible syrup. Among other non-alkaline organic substances showing such peptizing power may be mentioned milk sugar, maple sugar, honey, dextrose (glucose), xylose, maltose, and galactose, all of which are readily soluble in water. Most of these may be classed as carbohydrates, but water-soluble non-electrolytes, not in this class, such as the poly-hydric alcohols, glycerin and mannite have been found to have a similar peptizing effect on low-alkali silicates.

Glycerin however, in view of its hygroscopic nature, retards drying of the silicate and it accordingly is not as well adapted for quick drying compositions as the carbohydrates previously discussed.

As an illustration of the action of glycerin, the following example is given:

Centipoises
Silicate of 1:3.22 ratio, overconcentrated,
  viscosity _____ 804
Glycerin viscosity _____ 791
Silicate (as above) $+2\%$ glycerin viscosity_ 511
Silicate (as above) $+4\%$ glycerin viscosity_ 430
Silicate (as above) $+6\%$ glycerin viscosity_ 362
Silicate (as above) $+8\%$ glycerin viscosity_ 312
Silicate (as above) $+10\%$ glycerin viscosity_ 284
Silicate (as above) $+12\%$ glycerin viscosity_ 259
Silicate (as above) $+14\%$ glycerin viscosity_ 241

The peptizing action of mannite may be illustrated as follows:

Centipoises
Silicate of about 1 to 3.8 ratio, had viscosity
  of _____ 266
Same silicate $+\frac{1}{2}\%$ of mannite had viscosity of _____ 238
Same silicate $+1\%$ of mannite had viscosity of _____ 185

Although the use of alkali-metal silicates as adhesives is specially mentioned above, it is to be recognized that changes in the properties of these fluids may be of value in other uses also. Among these may be mentioned the application of silicate solutions as sizing and hardening agents, in compounding cements, in paints, and as protectors against corrosion. I do not, therefore, limit the scope of the invention in any way with reference to the uses which may be made of the modified silicate.

It is well known that alkali-metal silicates have been used for purifying solutions of sugar and other organic substances in the course of their manufacture, and that sugar and silicate have been used in whitewash and in construction of roads, to react with the lime compounds. The first mentioned of these uses brings about the formation of flocculent masses which carry down with them the impurities floating in the sugar or other solutions. The amounts of silicate used are small relative to the sugar and are removed from the sugar by precipitation as part of the process. The second mentioned of such uses depends upon chemical reaction with other substances, the function of the sugar being to modify the interaction of silicate and lime. However, the texture of the silicate solution is of no consequence in such uses thereof, and no product resulted comparable with that obtainable by the present invention.

Mixtures of alkali-metal silicates with starch and dextrin have been previously used, but starch and dextrin, although carbohydrates, are not readily soluble in water, and moreover, they have not been found to have the peptizing power referred to above, in colloidal solutions of alkali-metal silicates. On the contrary, they have a thickening and stiffening effect.

I claim as my invention:—

1. The method of modifying the fluidity of an aqueous soluble alkali-metal silicate composition containing silica and alkali metal oxide in a molecular ratio of from approximately 3.55 to 1, to approximately 4.5 to 1. which comprises adding dextrose to such solution.

2. The method of rendering more fluid an aqueous soluble alkali-metal silicate composition containing silica and alkali metal oxide in a molecular ratio of more than 3.55 to 1, which comprises adding to such solution a non-alkaline water soluble organic peptizing material selected from the group consisting of sucrose, milk sugar, maple sugar, levulose, glucose, xylose, maltose, and galactose.

3. An alkali metal silicate composition having a molecular ratio of silica to alkali-metal oxide of from approximately 3.55 to 1, to approximately 4.5 to 1. and containing in addition dextrose in amount sufficient to render the composition more fluid.

4. An alkali metal silicate composition having a molecular ratio of silica to alkali-metal oxide of from approximately 3.55 to 1, to approximately 4.5 to 1. and containing in addition maltose in amount sufficient to decrease the viscosity of the composition.

5. An alkali metal silicate composition having a molecular ratio of silica to alkali-metal oxide of from approximately 3.55 to 1, to approximately 4.5 to 1, and containing in addition sucrose in amount sufficient to render the composition more fluid.

6. The method of increasing the fluidity of alkali metal silicate compositions containing silica and alkali metal oxide in a molecular ratio of from approximately 3.55 to 1, to approximately 4.5 to 1, which comprises mixing the same with sucrose in amount sufficient to render the composition more fluid.

7. The method described in claim 6, wherein said compositions are mixed with an aqueous solution of sucrose.

8. An alkali-metal silicate composition having a molecular ratio of silica to alkali-metal oxide of from approximately 3.55 to 1, to approximately 4.5 to 1, and containing in addition a member selected from the group consisting of sucrose, milk sugar, maple sugar, levulose, glucose, xylose, maltose and galactose, in amount sufficient to render the composition more fluid.

9. The method of increasing the fluidity of an aqueous soluble alkali-metal silicate composition containing silica and alkali metal oxide in a molecular ratio of approximately 3.55 to 1, to approximately 4.5 to 1. which comprises adding to said solution maltose in amount sufficient to render the composition more fluid.

JOHN D. CARTER.